US012603344B2

(12) United States Patent
Migita et al.

(10) Patent No.: US 12,603,344 B2
(45) Date of Patent: Apr. 14, 2026

(54) METHOD FOR COOLING BATTERY

(71) Applicant: TOYOTA JIDOSHA KABUSHIKI KAISHA, Toyota (JP)

(72) Inventors: Tsubasa Migita, Sakai (JP); Masahide Iida, Toyota (JP); Yasumasa Oguma, Nagoya (JP); Yusuke Kuruma, Toyota (JP); Keisuke Ukita, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 18/644,736

(22) Filed: Apr. 24, 2024

(65) Prior Publication Data

US 2025/0023134 A1     Jan. 16, 2025

(30) Foreign Application Priority Data

Jul. 11, 2023     (JP) ................................. 2023-113529

(51) Int. Cl.
H01M 10/613 (2014.01)
H01M 10/0585 (2010.01)
(Continued)

(52) U.S. Cl.
CPC ..... H01M 10/613 (2015.04); H01M 10/0585 (2013.01); H01M 10/633 (2015.04); H01M 10/647 (2015.04); H01M 10/6561 (2015.04); H01M 10/6568 (2015.04); H01M 50/105 (2021.01); H01M 50/178 (2021.01);
(Continued)

(58) Field of Classification Search
CPC ........... H01M 10/613; H01M 10/6553; H01M 10/6556
See application file for complete search history.

(56) References Cited

U.S. PATENT DOCUMENTS

2014/0072839 A1*   3/2014   Park ...................... H01M 10/63
                                                                    429/50
2014/0356657 A1*   12/2014   Yamamoto ............ H01M 10/63
                                                                    429/62
(Continued)

FOREIGN PATENT DOCUMENTS

JP          2007-335352 A      12/2007
JP          2011-028893 A      2/2011
(Continued)

*Primary Examiner* — Eric S Ruppert
(74) *Attorney, Agent, or Firm* — SoraIP, Inc.

(57) ABSTRACT

In a laminated all-solid-state battery, a negative electrode terminal and a positive electrode terminal around which a resin sheet is wound are sandwiched between exterior members (laminate films), and the exterior members are joined by heat welding. The laminated all-solid-state battery is in contact with the heat exchanger via a heat conductive sheet. When the terminal temperature detected by the temperature sensor provided at the negative electrode terminal and the positive electrode terminal is equal to or higher than a predetermined value, the flow rate control valve is fully closed and the flow rate control valve is fully opened. The cooling amount of the joint portion in which the negative electrode terminal and the positive electrode terminal extend increases, the temperature of the joint portion decreases, the deformation of the resin sheet is suppressed, and the unsealing of the seal is suppressed.

3 Claims, 6 Drawing Sheets

(51) Int. Cl.

| | | |
|---|---|---|
| *H01M 10/633* | (2014.01) |
| *H01M 10/647* | (2014.01) |
| *H01M 10/6561* | (2014.01) |
| *H01M 10/6568* | (2014.01) |
| *H01M 50/105* | (2021.01) |
| *H01M 50/178* | (2021.01) |
| *H01M 50/188* | (2021.01) |
| *H01M 50/193* | (2021.01) |

(52) U.S. Cl.
CPC ....... *H01M 50/188* (2021.01); *H01M 50/193* (2021.01); *H01M 2220/20* (2013.01)

(56) References Cited

U.S. PATENT DOCUMENTS

| | | | |
|---|---|---|---|
| 2018/0114963 A1 | 4/2018 | Mitsuhashi | |
| 2019/0165435 A1* | 5/2019 | Jeong ................ | H01M 10/6553 |
| 2021/0013465 A1* | 1/2021 | Sakurai .............. | H01M 10/625 |
| 2022/0263206 A1* | 8/2022 | Fujisaki ............ | H01M 10/0585 |

FOREIGN PATENT DOCUMENTS

| | | |
|---|---|---|
| JP | 2018-073540 A | 5/2018 |
| JP | 2021-114373 A | 8/2021 |
| JP | 2022-014295 A | 1/2022 |
| JP | 2022-158090 A | 10/2022 |

* cited by examiner

METHOD FOR COOLING BATTERY

CROSS-REFERENCE TO RELATED APPLICATION

This application claims priority to Japanese Patent Application No. 2023-113529 filed on Jul. 11, 2023, incorporated herein by reference in its entirety.

BACKGROUND

1. Technical Field

The present disclosure relates to a method for cooling a battery.

2. Description of Related Art

All-solid-state batteries using solid electrolytes are known. For example, Japanese Unexamined Patent Application Publication No. 2021-114373 (JP 2021-114373 A) discloses a laminated all-solid-state battery in which a laminate film having a heat-welded (heat-fused) seal portion is used as an exterior member. In JP 2021-114373 A, the moisture permeability of the seal portion is calculated based on the internal moisture content of a battery pack that houses the laminated all-solid-state battery and the temperature of the seal portion. When the moisture permeability of the seal portion is equal to or higher than a threshold value, the seal portion is cooled.

SUMMARY

In the laminated all-solid-state battery, an electrode terminal (electrode tab) extends from the seal portion (joint portion) of the laminate film (exterior member). Since the laminate film is joined and sealed so as to sandwich the electrode terminal, the seal portion at the portion from which the electrode terminal extends is likely to be unsealed at the seal portion (joint portion) around the electrode terminal. When the unsealing is referred to as "seal-out", air enters from the seal-out portion. When moisture is contained in the entering air, the moisture reacts with the solid electrolyte or the like to generate gas. For example, when the all-solid-state battery is a sulfur-based all-solid-state battery, hydrogen sulfide is generated.

In particular, when the temperature in the vicinity of the electrode terminal increases, the seal portion (joint portion) at the portion from which the electrode terminal extends is deformed, and the seal-out is likely to occur.

An object of the present disclosure is to suppress the occurrence of seal-out at a joint portion from which an electrode terminal extends.

A method for cooling a battery according to the present disclosure is a method for cooling a battery including a power generation element including an all-solid-state battery stack, and an exterior member including a laminate film housing the power generation element and having an outer periphery joined by thermal welding to seal the power generation element. An electrode terminal of the power generation element extends from a joint portion of the exterior member. The method includes cooling the joint portion from which the electrode terminal extends when a terminal temperature of the joint portion from which the electrode terminal extends is higher than a first predetermined value.

In this method, the joint portion from which the electrode terminal extends is cooled when the terminal temperature is higher than the first predetermined value and there is a possibility that seal-out occurs at the joint portion from which the electrode terminal extends. Therefore, deformation of the joint portion from which the electrode terminal extends is suppressed, and the occurrence of the seal-out can be suppressed.

The cooling of the battery may be liquid cooling in which a heat medium flows through a flow path of a heat exchanger. In the cooling method, when the terminal temperature is higher than the first predetermined value, the joint portion may be cooled by increasing a flow rate of a heat medium in the flow path corresponding to the joint portion from which the electrode terminal extends. When the terminal temperature is lower than a second predetermined value smaller than the first predetermined value, the battery may be cooled by the heat medium flowing through an entire flow path of the heat exchanger.

In this method, the battery is cooled by liquid cooling. When the terminal temperature is higher than the first predetermined value, the joint portion is cooled by increasing the heat medium flow rate in the flow path corresponding to the joint portion from which the electrode terminal extends. Accordingly, the joint portion is cooled when there is a possibility that the seal-out occurs at the joint portion from which the electrode terminal extends. Therefore, deformation of the joint portion from which the electrode terminal extends is suppressed, and the occurrence of the seal-out can be suppressed.

When the terminal temperature is lower than the second predetermined value smaller than the first predetermined value, the battery is cooled by the heat medium flowing through the entire flow path of the heat exchanger. Therefore, the battery can be cooled appropriately, and deterioration of the battery or the like can be suppressed.

The cooling of the battery may be air cooling. In the cooling method, when the terminal temperature is higher than the first predetermined value, cooling air may be supplied to the joint portion from which the electrode terminal extends.

In this method, when the terminal temperature is higher than the first predetermined value, cooling air is supplied to the joint portion from which the electrode terminal extends. Accordingly, the joint portion is cooled by cooling air when there is a possibility that the seal-out occurs at the joint portion from which the electrode terminal extends. Therefore, deformation of the joint portion from which the electrode terminal extends is suppressed, and the occurrence of the seal-out can be suppressed.

A thermoplastic resin sheet may be disposed between the electrode terminal and the exterior member at the joint portion from which the electrode terminal extends. In the cooling method, when the terminal temperature is higher than the first predetermined value, the joint portion including the resin sheet may be cooled.

To improve the sealing performance (seal integrity) at the joint portion from which the electrode terminal extends, the thermoplastic resin sheet is disposed between the electrode terminal and the exterior member, and the exterior member is joined and sealed by thermal welding. When the terminal temperature increases, there is a possibility that the resin sheet is deformed and unsealing occurs. In this cooling method, when the terminal temperature is higher than the first predetermined value, the joint portion including the resin sheet is cooled. Accordingly, the joint portion including the resin sheet is cooled when there is a possibility that the seal-out occurs at the joint portion from which the electrode terminal extends. Therefore, deformation of the resin sheet is suppressed, and the occurrence of the seal-out can be suppressed.

The all-solid-state battery stack may be a sulfide-based all-solid-state battery.

With this method, generation of hydrogen sulfide due to the seal-out can be suppressed.

According to the present disclosure, it is possible to suppress the occurrence of the seal-out at the joint portion from which the electrode terminal extends.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
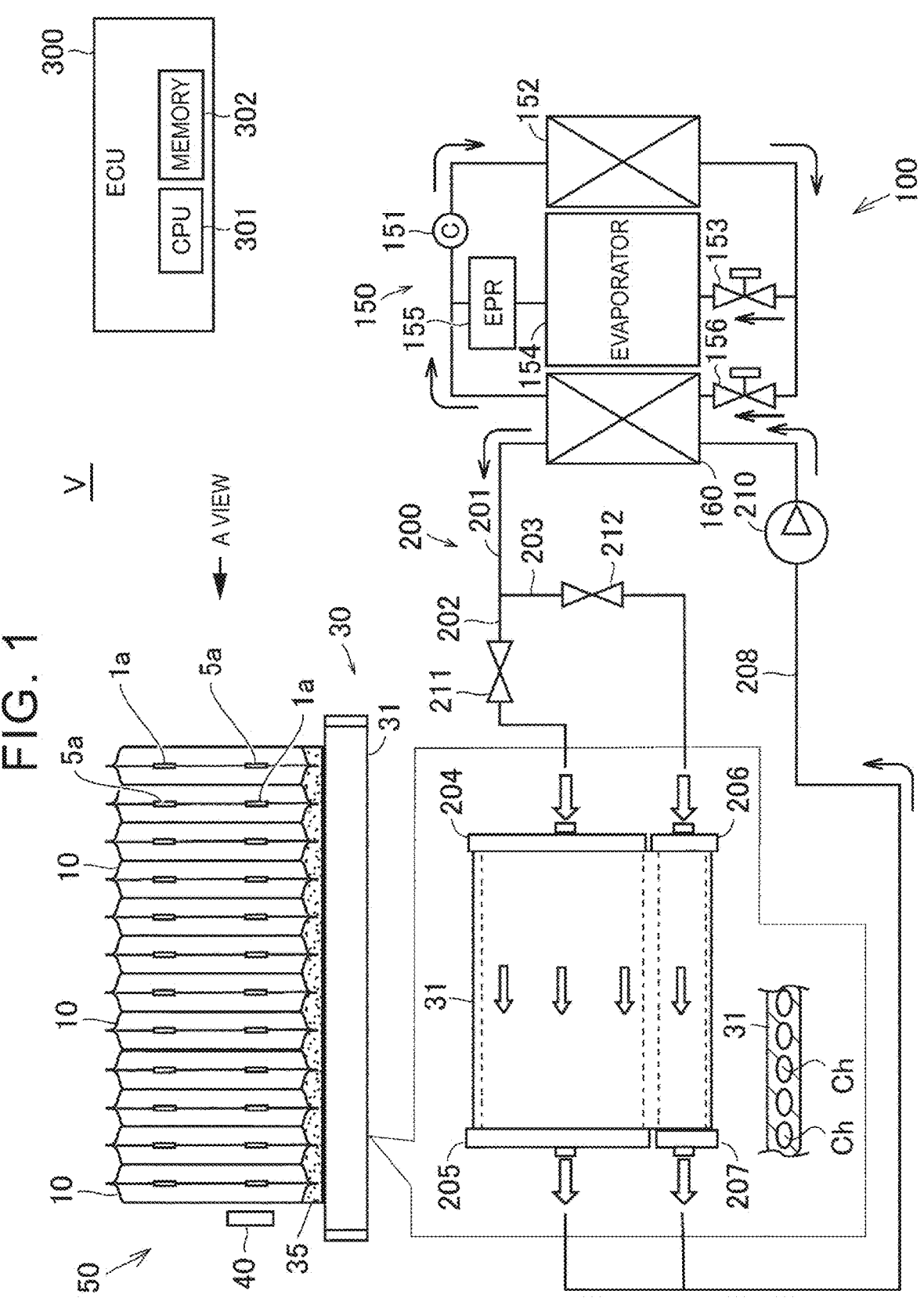
FIG. 1 is a diagram schematically showing an overall configuration of a vehicle equipped with a battery module according to the present embodiment.

Hereinafter, embodiments of the present disclosure will be described in detail with reference to the drawings. It should be noted that the same or corresponding portions in the drawings are designated by the same reference signs and repetitive description will be omitted.

FIG. 1 is a diagram schematically showing an overall configuration of a vehicle V equipped with a battery module 50 according to the present embodiment. The vehicle V includes a battery module 50 that stores electric power for traveling. The vehicle V is configured to be able to travel using the electric power stored in the battery module 50. In the present embodiment, the vehicle V may be a battery electric vehicle (BEV) without an engine (internal combustion engine), and may be a hybrid electric vehicle (HEV with an engine) or a plug-in hybrid electric vehicle (PHEV).

The vehicle V is provided with a control device (Electronic Control Unit (ECU)) 300. ECU 300 is configured to perform charge-control, discharge-control, and cooling-control of the battery module 50. ECU 300 includes a processor 301 and memories 302. The processor 301 executes a program stored in the memory 302 to execute various kinds of control in ECU 300.

The vehicle V includes a traveling drive unit including a Power Control Unit (PCU) and a Motor Generator (MG) (not shown), and is configured to drive MG using the electric power stored in the battery module 50 to cause the vehicle V to travel. MG is configured to perform regenerative power generation and provide the generated electric power to the battery module 50. The battery module 50 is configured to be capable of external charging using an external power source by a charging circuit (not shown).

Figure 2A:
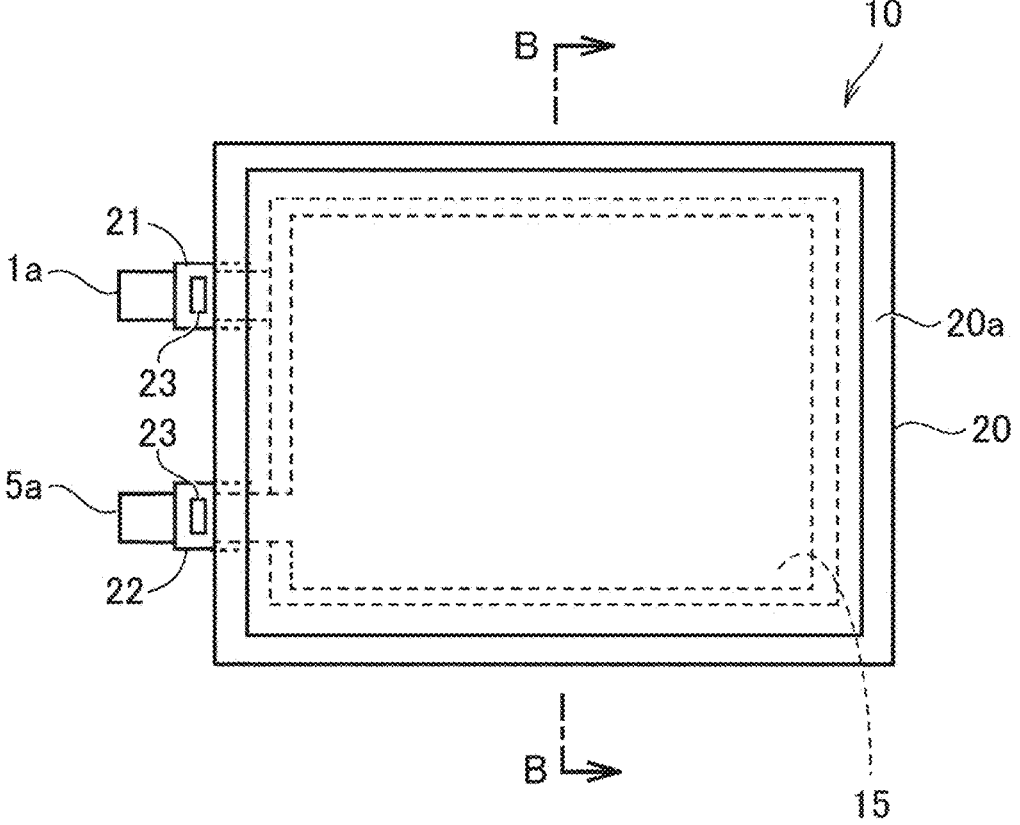
FIG. 2A is a diagram illustrating a schematic configuration of a laminated all-solid-state battery 10 according to an embodiment of the present disclosure.
Figure 2B:
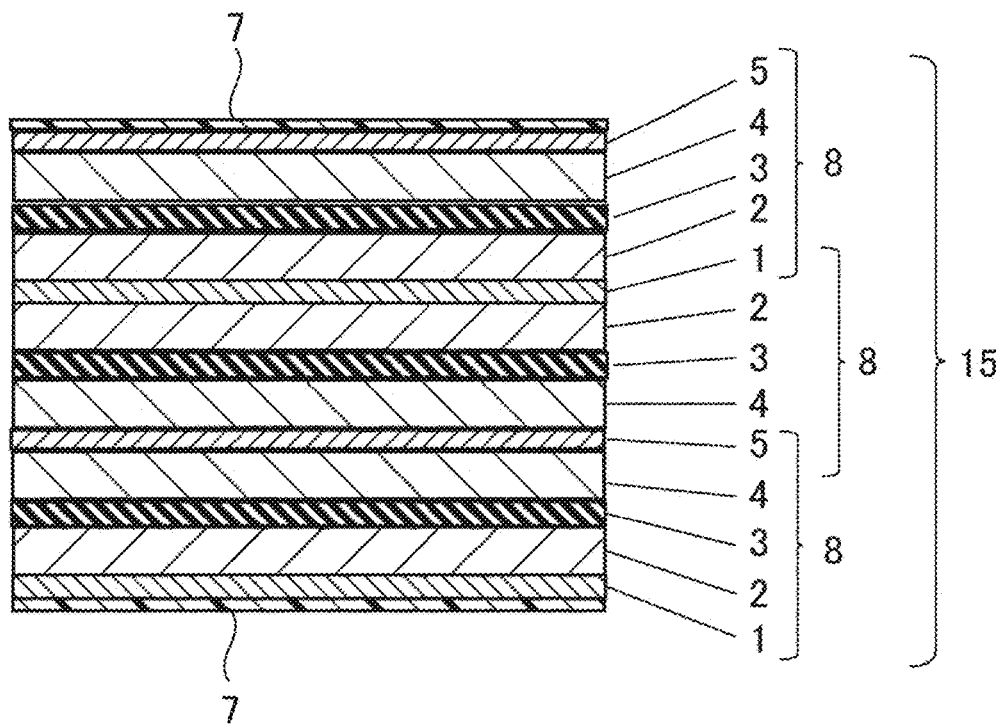
FIG. 2B is a diagram illustrating a schematic configuration of a laminated all-solid-state battery 10 according to an embodiment of the present disclosure.

The battery module 50 is a battery pack in which the laminated all-solid-state batteries 10 are electrically connected in series. FIGS. 2A and 2B are diagrams illustrating a schematic configuration of a laminated all-solid-state battery 10 according to the present embodiment. FIG. 2A is a top view of a laminated all-solid-state battery 10 (as viewed from A in FIG. 1). The laminated all-solid-state battery 10 is an all-solid-state battery using a laminate film as the exterior member 20, and a negative electrode terminal (negative electrode tab) $1a$ and a positive electrode terminal (positive electrode tab) $5a$ extend from the exterior member 20. The negative electrode terminal $1a$ and the positive electrode terminal $5a$ are "electrode terminals" disclosed herein. The laminate film may be, for example, a pouch made of an aluminum laminate film, and may be a film having a three-layer structure in which an aluminum foil is sandwiched between resin films. The resinous films may include, for example, polypropylene (PP), polyethylene terephthalate (PET), and the like.

FIG. 2B is an all-solid-state battery stack 15 housed in the exterior member 20, and shows a II-II cross-section of FIG. 2A. In the all-solid-state battery stack 15, all-solid-state battery elements 8 in which the negative electrode current collector layer 1, the negative electrode active material layer 2, the solid electrolyte layer 3, the positive electrode active material layer 4, and the positive electrode current collector layer 5 are stacked in this order share the negative electrode current collector layer 1 and the positive electrode current collector layer 5, and three of them are stacked in the reverse direction in the stacking order. The negative electrode current collector layer 1 is connected to the negative electrode terminal $1a$, and the positive electrode current collector layer 5 is connected to the positive electrode terminal $5a$. The number of all-solid-state battery elements 8 included in the all-solid-state battery stack 15 may be one or four or more. An insulating film 7 provides insulation between the all-solid-state battery stack 15 and the exterior member (laminate film) 20. The all-solid-state battery stack 15 or the all-solid-state battery element 8 corresponds to an example of a "power generation element" of the present disclosure.

The laminated all-solid-state battery 10 is a sulfide-based all-solid-state battery. In the present disclosure, a sulfide-based all-solid-state battery contains a sulfur component in at least one of the material of the positive electrode active material layer 4 and the material of the solid electrolyte layer 3. In the present embodiment, the solid electrolyte layer 3 includes a sulfide-based solid electrolyte, and for example, the sulfide-based solid electrolyte may be made of phosphorus pentasulfide ($P_2S_5$) and lithium sulfide ($Li_2S$) as a starting material. In this case, the positive electrode active material layer 4 may contain, for example, lithium cobalt oxide, lithium nickel oxide, lithium iron phosphate, and the like. When the solid electrolyte layer 3 consists of an oxide-based solid electrolyte, the positive electrode active material layer 4 is made of a sulfur-based positive electrode active material. The sulfur-based positive electrode active material may be an organic sulfur compound or an inorganic sulfur compound. Note that both the solid electrolyte layer 3 and the positive electrode active material layer 4 may contain the sulfur component.

After the all-solid-state battery stack 15 is accommodated in the exterior member (laminate film) 20, the outer periphery (peripheral portion) of the exterior member 20 is joined by heat welding (heat fusion), and the all-solid-state battery stack 15 is scaled. As a result, a joint portion (sealing portion) 20a is formed. Resin sheets 21 and 22 covering both front and back surfaces of the negative electrode terminal 1a and the positive electrode terminal 5a are provided in order to improve the sealing property between the negative electrode terminal 1a and the positive electrode terminal 5a and the exterior member 20. The resin sheets 21 and 22 are formed in a band shape by a resin material such as PP or PE, and are wound around the negative electrode terminal 1a and the positive electrode terminal 5a. Then, the negative electrode terminal 1a and the positive electrode terminal 5a around which the resin sheets 21 and 22 are wound are sandwiched between the exterior members 20, and the exterior members 20 are joined by thermal welding. The joint portion where the negative electrode terminal 1a and the positive electrode terminal 5a extend may be joined by thermal welding by ultrasonic welding using a horn, and the other joint portion may be joined by thermal welding using a heat bar.

Referring to FIG. 1, a plurality of laminated all-solid-state batteries 10 are stacked and electrically connected in series (bus bars are not shown), thereby forming a battery module 50. The battery module 50 is in contact with the heat exchanger (cooling plate) 30 via the heat conductive sheet 35. In the present embodiment, the battery module 50 can be cooled by the cooling device 100. The cooling device 100 includes a refrigeration cycle 150, a chiller 160, and a cooling circuit 200. The refrigeration cycle 150 is a refrigeration cycle for air-conditioning of the vehicle V, and includes a compressor 151, a condenser 152, an electric expansion valve 153, an evaporator 154, and an evaporative pressure-regulating valve (Evaporative Pressure Regulator (EPR)) 155 and electric expansion valve 156. The chiller 160 is connected to the refrigeration cycle 150 and the cooling circuit 200, and performs heat exchange between the refrigerant of the refrigeration cycle 150 and the heat medium of the cooling circuit 200. The heating medium may be, for example, an insulating antifreeze. The cooling circuit 200 includes a pump 210 and circulates a heat medium flowing into the heat exchanger (cooling plate) 30 through the heat medium passage 201 in the cooling circuit 200. Refrigeration cycle 150 (including compressor 151 and various valves) and pumping 210 are controlled by a ECU 300.

The heat exchanger (cooling plate) 30 exchanges heat with the battery module 50, and cools the battery module 50 with a heat medium. In the present embodiment, the heat exchanger 30 is composed of a multi-hole pipe 31 in which a plurality of heat medium flow paths Ch are formed and a plurality of headers (manifolds) 204 to 207, and the multi-hole pipe 31 is made of, for example, aluminum or an aluminum alloy, and is manufactured using extrusion molding.

The heat medium discharged from the chiller 160 flows through the heat medium passage 201 and branches into a heat medium passage 202 and a heat medium passage 203. A flow rate control valve 211 is provided in the heat medium passage 202, and a flow rate control valve 212 is provided in the heat medium passage 203. The heat medium that has passed through the flow rate control valve 211 flows into the header 204, flows through the heat medium flow path Ch of the multi-hole pipe 31, exchanges heat with the battery module 50, and flows into the header 205. The heat medium that has passed through the flow rate control valve 212 flows into the header 206, flows through the heat medium flow path Ch of the multi-hole pipe 31, performs the heat root with the battery module 50, and flows into the header 207. The heat medium flowing into the header 205,207 is returned to the pump 210 by the heat medium passage 208.

Figure 3:
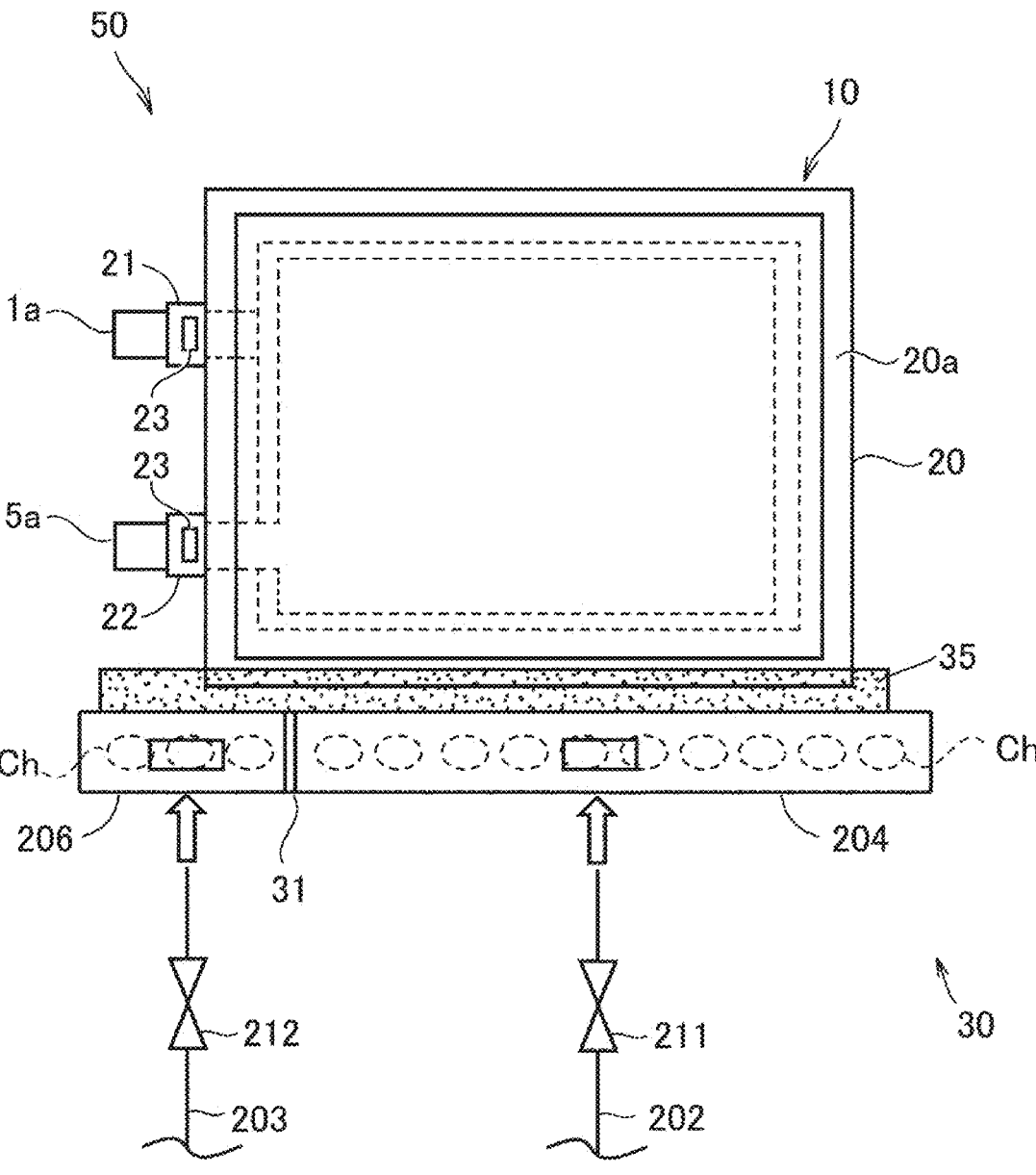
FIG. 3 is a diagram showing a relationship between a heat exchanger and a laminated all-solid-state battery.

FIG. 3 is a diagram showing a relationship between the heat exchanger (cooling plate) 30 and the laminated all-solid-state battery 10 (battery module 50). FIG. 3 is an A view in FIG. 1. The heat medium passing through the flow rate control valve 212 and flowing into the header 206 flows through the negative electrode terminal 1a, the positive electrode terminal 5a, and the heat medium flow path Ch located below the resin sheets 21 and 22 in the drawing. The joint portion where the negative electrode terminal 1a and the positive electrode terminal 5a extend is cooled by the thermal medium flowing into the header 206. Further, the heat medium that has passed through the flow rate control valve 211 and has flowed into the header 204 flows through the negative electrode terminal 1a, the positive electrode terminal 5a, and the heat medium flow path Ch at positions other than the illustrated lower portions of the resin sheets 21 and 22.

Referring to FIG. 1, the monitoring unit 40 includes various sensors that detect the status (e.g., voltage, current, and temperature) of the battery module 50, and outputs the detected data to ECU 300. As shown in FIGS. 2A and 3, a temperature sensor 23 is provided in the negative electrode terminal 1a and the positive electrode terminal 5a of the laminated all-solid-state battery 10 (more specifically, in the resin sheets 21 and 22). The temperature sensor 23 detects the terminal temperature Tb, which is the temperature of the negative electrode terminal 1a and the positive electrode terminal 5a, and outputs the detected temperature to ECU 300.

In the laminated all-solid-state battery 10, for example, there is a concern that air enters from a sealing portion (joint portion) of the exterior member 20 (laminate film). When moisture is contained in the entering air, there is a possibility that the sulfur component contained in the solid electrolyte layer 3 or the positive electrode active material layer 4 reacts with moisture to generate and release hydrogen sulfide. In particular, in the laminated all-solid-state battery 10, the negative electrode terminal 1a and the positive electrode terminal 5a (electrode tabs) extend from the sealing portion (joint portion) of the exterior member 20, and the exterior member (laminate film) 20 is bonded and sealed so as to sandwich the negative electrode terminal 1a and the positive electrode terminal 5a. Therefore, when the temperature becomes high, the seal portion (joint portion) is deformed and the seal is easily released, and there is a concern that a seal-out may occur.

Further, in the present embodiment, in order to improve the sealing property between the negative electrode terminal 1a and the positive electrode terminal 5a and the exterior member 20, the resin sheets 21 and 22 are wound around the negative electrode terminal 1a and the positive electrode terminal 5a and sandwiched between the exterior members 20, and the exterior member 20 is thermally welded. Therefore, when the joint portion where the negative electrode terminal 1a and the positive electrode terminal 5a extend becomes high in temperature, the resin sheets 21 and 22 may be deformed and the scaling may be easily released.

Figure 4:
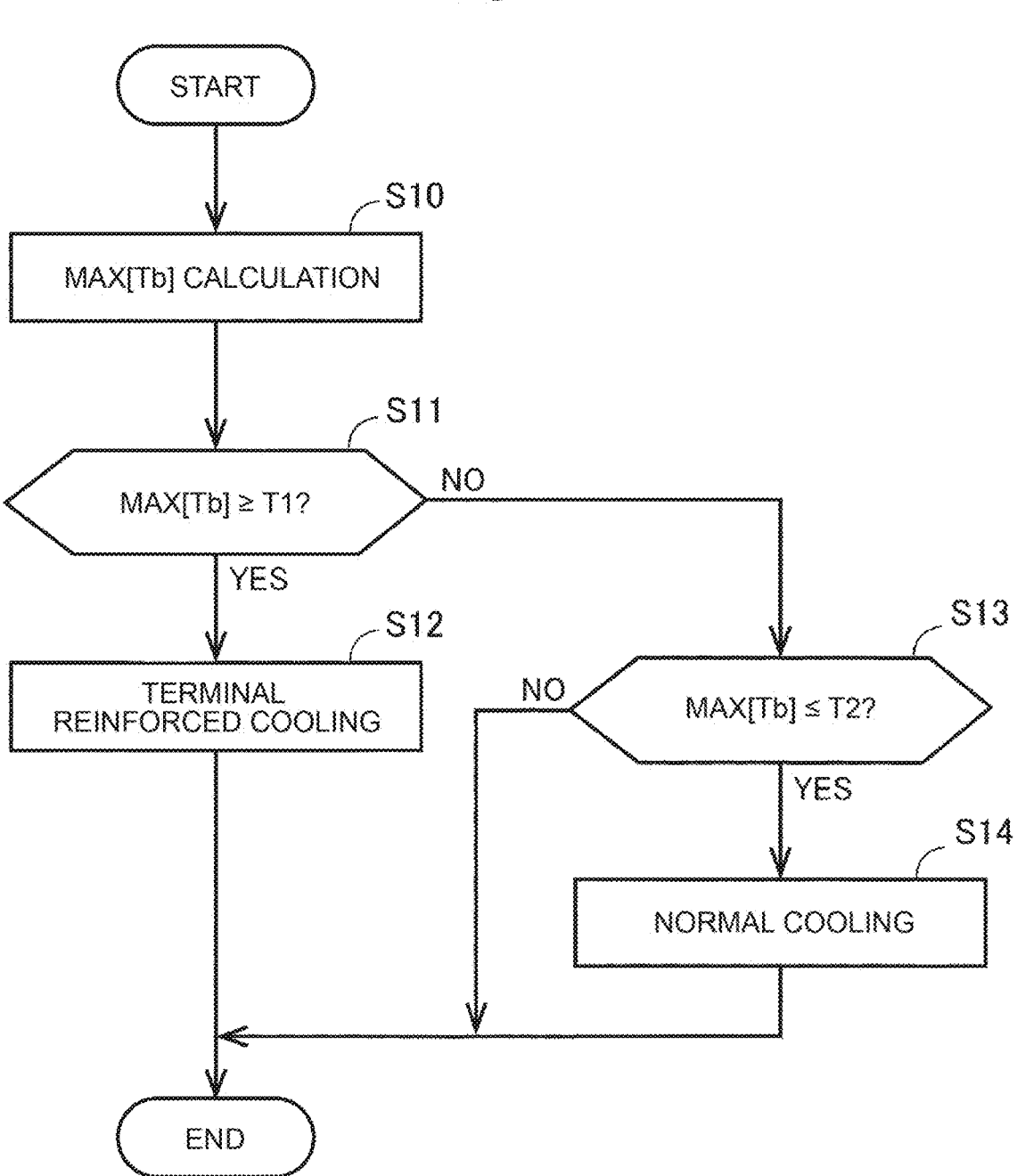
FIG. 4 is a flow chart illustrating an exemplary process of cooling control performed in ECU.

In the present embodiment, when the joint portion in which the negative electrode terminal 1a and the positive electrode terminal 5a extend is at a high temperature and there is a possibility that the sealing is released, the joint portion is cooled to suppress the generation of the sealing out. FIG. 4 is a flow chart illustrating an exemplary process of cooling control executed by ECU 300. This flow chart is repeatedly processed at predetermined intervals when the power switch of the vehicle V is ON and during the external charge of the battery module 50.

In step (hereinafter, step is abbreviated as "S") 10, the terminal temperature Tb is acquired from the detected signals of the respective temperature sensors 23 provided in the laminated all-solid-state battery 10 (the battery module 50), and the highest temperature MAX[Tb] of the acquired terminal temperature Tb is calculated.

In the following S11, it is determined whether or not the maximum-temperature MAX[Tb] is equal to or greater than a predetermined value T1. The predetermined value T1 is a value that is set in advance in an experiment or the like, and is a value that, when the terminal temperature Tb exceeds the predetermined value T1 for a predetermined period of time, there is a possibility that the sealing of the joint portion in which the negative electrode terminal 1a and the positive electrode terminal 5a extend may be released. The predetermined value T1 corresponds to the "first predetermined value" of the present disclosure. If the maximum temperature MAX[Tb] is greater than or equal to the predetermined value T1 (MAX[Tb]≥T1), an affirmative determination is made, and the process proceeds to S12, and if the maximum temperature MAX[Tb] is less than the predetermined value T1 (MAX[Tb]<T1), a negative determination is made, and the process proceeds to S13.

In S12, the terminal enhancement cool-down is executed, and the present routine is terminated. The default (initial setting) in the cooling control is the normal cooling described later. If the currently running cooling control is normal cooling, it is switched to terminal enhanced cooling. If the current cooling control is terminal enhanced cooling, terminal enhanced cooling is continued. In terminal enhanced cooling, the flow rate control valve 211 is fully closed and the flow rate control valve 212 is fully opened. As a result, the entire amount of the heat medium discharged from the chiller 160 flows into the header 206 and flows through the negative electrode terminal 1a, the positive electrode terminal 5a, and the heat medium flow path Ch located below the resin sheets 21 and 22 (see FIG. 3). As a result, the cooling amount (the heat-exchange amount) of the joint portion in which the negative electrode terminal 1a and the positive electrode terminal 5a extend increases, the temperature of the joint portion decreases, the deformation of the resin sheet 21 and the resin sheet 22 is suppressed, and the unscaling can be suppressed.

In S13, it is determined whether or not the maximum-temperature MAX[Tb] is equal to or less than a predetermined value T2. The predetermined value T2 is a value that is set in advance in an experiment or the like, and is a value that, when the terminal temperature Tb is equal to or lower than the predetermined value T2, the sealing can be maintained without deformation of the joint portion from which the negative electrode terminal 1a and the positive electrode terminal 5a extend and the resin sheets 21 and 22. The predetermined value T2 is a value smaller than the predetermined value T1. The predetermined value T2 corresponds to the "second predetermined value" of the present disclosure. If the maximum-temperature MAX[Tb] is less than or equal to the predetermined value T2 (MAX[Tb]≤T2), an affirmative determination is made and the process proceeds to S14. If the maximum-temperature MAX[Tb] is higher than the predetermined value T2 (MAX[Tb]>T2), the present routine is terminated (the present form of cooling control (terminal enhanced cooling/normal cooling) is continued).

In S14, normal refrigeration is executed, and the present routine is ended. If the current cooling control is terminal enhanced cooling, it is switched to normal cooling. If the currently running cooling control is normal cooling, normal cooling is continued. In the normal cooling, the opening degree of the flow rate control valve 211, 212 is controlled so that the temperature of the battery module 50 (laminated all-solid-state battery 10) detected by the monitoring unit 40 falls within a set range. Accordingly, the temperature of the battery module 50 can be maintained at an appropriate temperature by the heat medium flowing through all the heat medium flow paths Ch of the heat exchanger 30 (the multi-hole pipe 31).

According to the present embodiment, when the maximum-temperature MAX[Tb] is equal to or higher than the predetermined value T1, the cooling amount (the heat-exchange amount) of the joint portion in which the negative electrode terminal 1a and the positive electrode terminal 5a extend increases, and the joint portion is cooled, so that the deformation of the joint portion is suppressed and the generation of the seal-out can be suppressed. Thus, hydrogen sulfide can be suppressed from being released from the laminated all-solid-state battery 10 which is a sulfide-based solid-state battery.

In the present embodiment, when the maximum-temperature MAX[Tb] is equal to or lower than the predetermined value T2, the battery module 50 (laminated all-solid-state battery 10) is cooled by the heat medium flowing through all the heat medium flow paths Ch of the heat exchanger 30 (the multi-hole pipe 31). As a result, the laminated all-solid-state battery 10 can be cooled appropriately, and deterioration of the battery can be suppressed.

Modifications

Figure 5A:
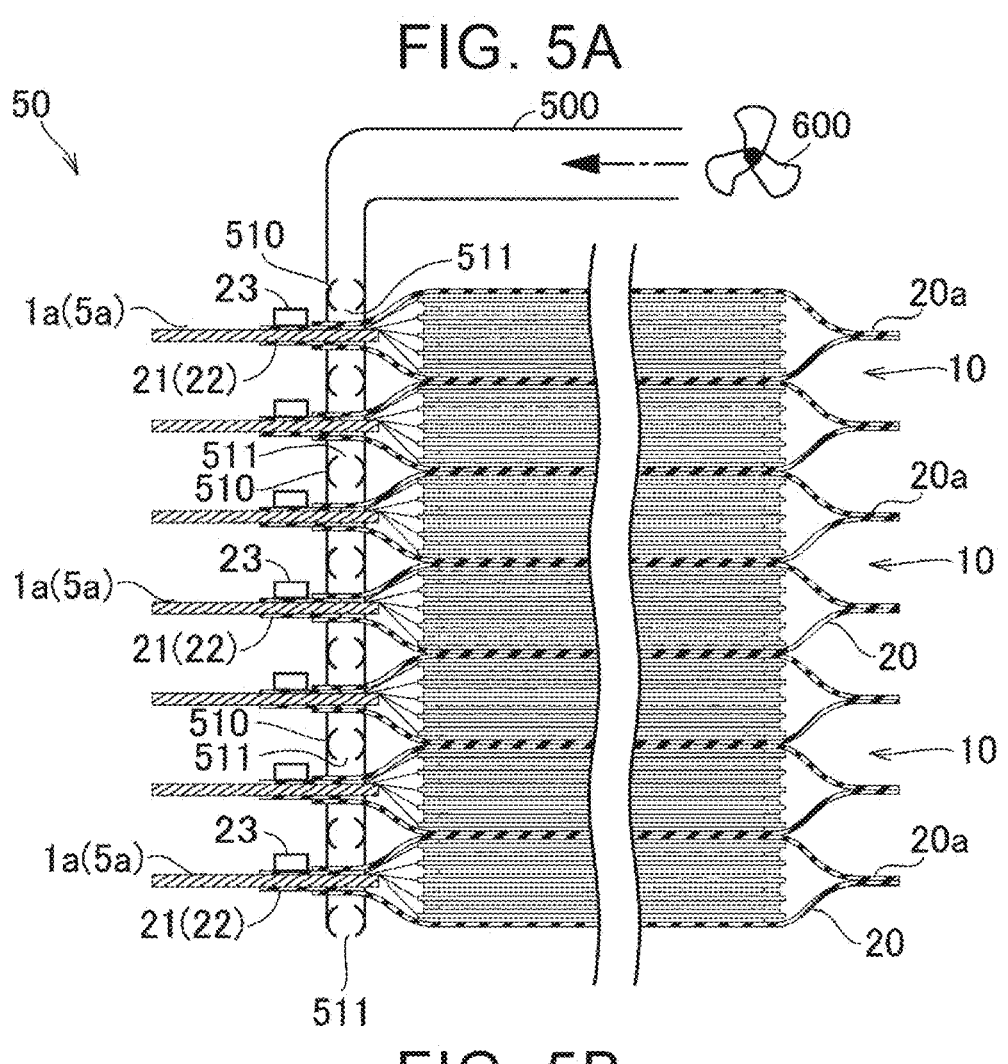
FIG. 5A is a schematic diagram illustrating how to cool a battery module in a modified embodiment.
Figure 5B:
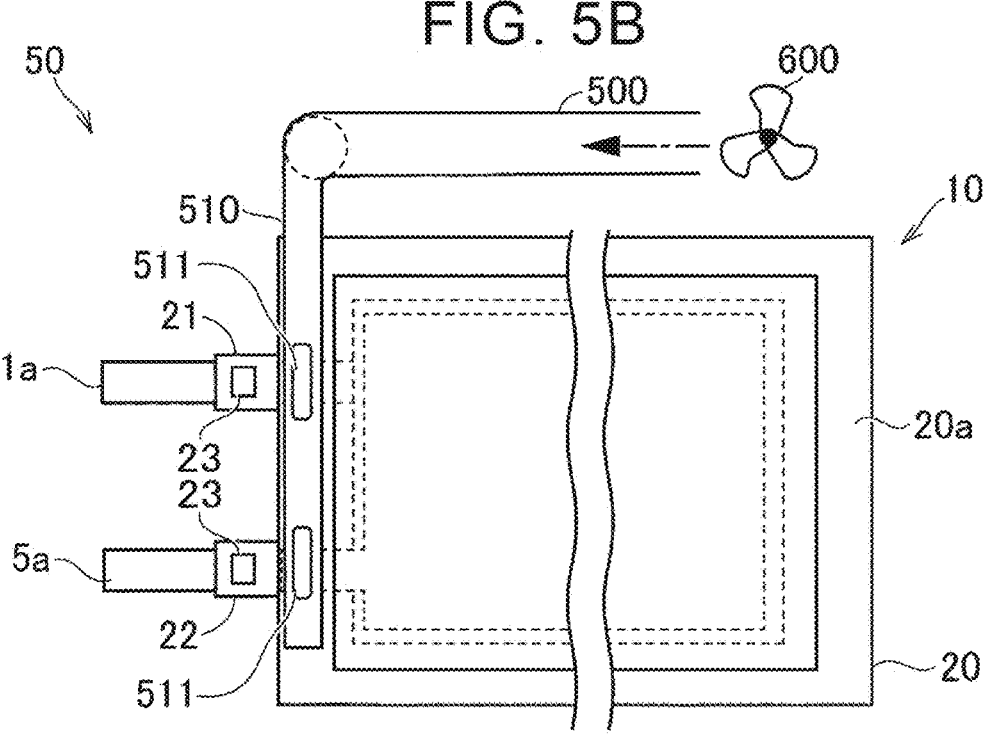
FIG. 5B is a schematic diagram illustrating how to cool a battery module according to a modified embodiment.

FIGS. 5A and 5B are schematic diagrams for explaining how to cool the battery module 50 according to the modification. In the modified example, the battery module 50 (laminated all-solid-state battery 10) is cooled by air cooling. In a modification, as shown in FIG. 5A, a plurality of laminated all-solid-state batteries 10 are stacked vertically in the drawing and electrically connected in series to form a battery module 50. In FIGS. 5A and 5B of the drawings, the bus bar is omitted, and in FIG. 5A of the drawings, a cross-sectional view of the laminated all-solid-state battery 10 is used. Note that FIG. 5B is a top view of the battery module 50.

In the modification, the branch cooling air passage 510 is disposed at a position facing the negative electrode terminal 1a, the positive electrode terminal 5a, and the resin sheets 21, and 22 of each of the laminated all-solid-state batteries 10. As shown in FIGS. 5A and 5B, the branch cooling air passage 510 branches off from the cooling air passage 500 and extends at a position facing the negative electrode terminal 1a, the positive electrode terminal 5a, and the resin sheets 21 and 22 of the laminated all-solid-state batteries 10. When the cooling fan 600 is driven, the cooling air is introduced into the branch cooling air passage 510 via the cooling air passage 500.

The branch cooling air passage 510 is provided with a blowout hole 511 through which cooling air is supplied toward a joint portion where the negative electrode terminal 1a and the positive electrode terminal 5a of each of the laminated all-solid-state batteries 10 extend. As a result, when cooling air is supplied from the blowout hole 511 to the joint portion (when blown), the joint portion is cooled and the temperature of the joint portion is lowered.

Figure 6:
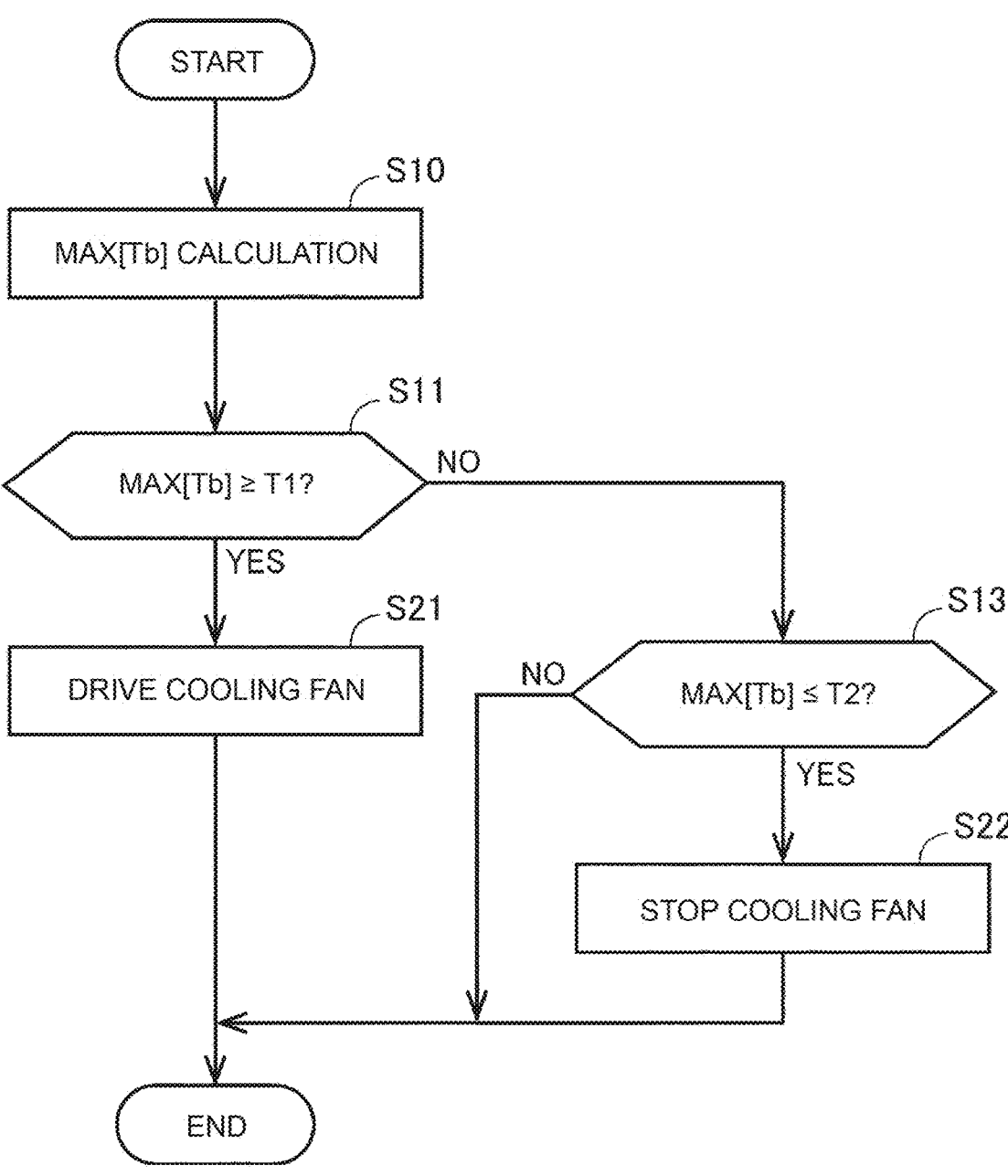
FIG. 6 is a flow chart illustrating an example of a process of cooling control executed by ECU in a modification example.

FIG. 6 is a flow chart illustrating an example of a process of cooling control executed by ECU in a modification example. This flow chart is also repeatedly processed at predetermined intervals when the power-switch of the vehicle V is ON and during the external charge of the battery module 50. In FIG. 6, S10, S11, S13 are the same process as the flow chart of FIG. 4.

When the maximum-temperature MAX[Tb] is equal to or higher than the predetermined value T1 and an affirmative determination is made on S11, the cooling fan 600 is driven in S21, and the cooling air is supplied from the blowout hole 511. The cooling air supplied from the blow-out hole 511 cools the joint portion where the negative electrode terminal 1*a* and the positive electrode terminal 5*a* of each of the laminated all-solid-state batteries 10 extend. Note that the default (initial setting) of the cooling control in the modification is a state in which the cooling fan 600 is stopped. Currently, when the cooling fan 600 is stopped, the cooling fan 600 is driven, and the present routine is ended. Currently, when the cooling fan 600 is being driven, the driving of the cooling fan 600 is continued, and the present routine is ended.

When the maximum-temperature MAX[Tb] is equal to or lower than the predetermined value T2 and an affirmative determination is made on S13, the driving of the cooling fan 600 is stopped in S21, and the present routine is ended. When the maximum-temperature MAX[Tb] is higher than the predetermined value T2 and a negative determination is made in S13, the present form of the cooling fan 600 (driving/stopping of the cooling fan 600) is continued, and the present routine is ended.

According to this modification, when the maximum-temperature MAX[Tb] is equal to or higher than the predetermined value T1, the cooling air is supplied to the joint portion from which the negative electrode terminal 1*a* and the positive electrode terminal 5*a* extend, and the joint portion is cooled, so that the deformation of the joint portion is suppressed and the sealing out can be suppressed. Further, when the maximum-temperature MAX[Tb] becomes equal to or lower than the predetermined value T2, the supplying of the cooling air is stopped, so that the joint portion can be suppressed from becoming subcooled.

In the above-described embodiment, the maximum-temperature MAX[Tb is compared with the predetermined values T1, T2. ECU 300 may calculate an average value of the terminal temperature Tb detected by each temperature sensor 23 and compare the average value with a predetermined values T1, T2.

In the above-described embodiment, the terminal temperature Tb detected by the temperature sensor 23 is used, but the temperature of the joint portion in which the negative electrode terminal 1*a* and the positive electrode terminal 5*a* extend may be acquired (estimated) by other means. For example, the monitoring unit 40 determines the internal resistance of the laminated all-solid-state battery 10. The temperature of the joint portion may be estimated based on the input/output current value and the internal resistance of the laminated all-solid-state battery 10. In this case, the temperature of the joint portion may be estimated in consideration of the temperature of the battery module 50 (laminated all-solid-state battery 10) detected by the monitoring unit 40.

In the above embodiment, an example in which the battery module 50 is mounted on the vehicle V has been described. The battery module 50 may be a stationary power storage device.

The embodiment disclosed herein should be considered as illustrative and not restrictive in all respects. The scope of the present disclosure is shown by the claims, rather than the above embodiments, and is intended to include all modifications within the meaning and the scope equivalent to those of the claims.

What is claimed is:

1. A method for cooling a battery including
a power generation element including an all-solid-state battery stack, and
an exterior member including a laminate film housing the power generation element and having a peripheral edge joined by thermal welding to seal the power generation element,
an electrode terminal of the power generation element extending from a joint portion of the exterior member, the method comprising:
detecting a terminal temperature of the joint portion from which the electrode terminal extends;
cooling the joint portion by fully opening a flow rate control valve provided in a flow path of a heat exchanger corresponding to the joint portion and increasing a flow rate of a heat medium in the flow path in a case where the terminal temperature is higher than a first predetermined value; and
cooling the battery by the heat medium flowing through an entire flow path of the heat exchanger in a case where the terminal temperature is equal to or lower than the first predetermined value, wherein
the heat medium flowing through the flow path is a liquid cooling medium, and
a thermoplastic resin sheet is disposed between the electrode terminal and the exterior member at the joint portion.

2. The method according to claim 1, wherein the all-solid-state battery stack is a sulfide-based all-solid-state battery.

3. The method according to claim 1, wherein:
the thermoplastic resin sheet is wrapped around the electrode terminal; and
the terminal temperature is detected by a temperature sensor provided in the thermoplastic resin sheet.

* * * * *